(12) United States Patent
Kekre et al.

(10) Patent No.: US 7,305,529 B1
(45) Date of Patent: Dec. 4, 2007

(54) COOPERATIVE DATA REPLICATION

(75) Inventors: Anand A. Kekre, Pune (IN); Ankur P. Panchbudhe, Nagpur (IN); Amol Katkar, Pune (IN)

(73) Assignee: Symantec Corporation, Cupertino, CA (US)

( * ) Notice: Subject to any disclaimer, the term of this patent is extended or adjusted under 35 U.S.C. 154(b) by 373 days.

(21) Appl. No.: 10/742,130

(22) Filed: Dec. 19, 2003

(51) Int. Cl.
*G06F 12/00* (2006.01)
*G06F 17/30* (2006.01)

(52) U.S. Cl. .................. 711/162; 711/112; 711/114; 707/8

(58) Field of Classification Search .............. None
See application file for complete search history.

(56) References Cited

U.S. PATENT DOCUMENTS

| | | | |
|---|---|---|---|
| 4,432,057 A * | 2/1984 | Daniell et al. ............ 707/8 |
| 5,488,731 A * | 1/1996 | Mendelsohn ............ 711/114 |
| 5,787,247 A * | 7/1998 | Norin et al. ............ 709/220 |
| 6,529,960 B2 * | 3/2003 | Chao et al. ............ 709/238 |

* cited by examiner

*Primary Examiner*—Hyung Sough
*Assistant Examiner*—Mardochee Chery
(74) *Attorney, Agent, or Firm*—Campbell Stephenson LLP

(57) ABSTRACT

A method or apparatus for cooperative data replication. The method in one embodiment can be performed by a computer system or several computer systems executing software instructions. The method may include modifying data in n data blocks of a data volume to create n modified data blocks. A copy of each of the n modified data blocks is created for subsequent transfer to other nodes. A first computer system transmits the n modified data block copies to n nodes, respectively, wherein each of the n nodes comprises a second computer system and a replica of the data volume prior to the modification of data in the n data blocks. Thereafter, one of the n second computer systems transmits a copy of the modified data block copy it receives to another of the n second computer systems.

15 Claims, 3 Drawing Sheets

COOPERATIVE DATA REPLICATION

BACKGROUND OF THE INVENTION

Many businesses such as insurance companies, banks, brokerage firms, etc., rely heavily on data processing systems for storing and processing business critical data. Businesses seek reliable mechanisms to protect their data from natural disasters, acts of terrorism, computer hardware failure, or computer software failure.

Replication is one mechanism used by many businesses to ensure reliable access to data. Data replication is well known in the art. Essentially, replication is a process of creating at remotely located sites one or more real or near real-time copies (replicas) of a data volume. FIG. 1 shows (in block diagram form) a data processing system 10 in which data replication is employed to create and maintain three replicas of a data volume. More particularly, FIG. 1 shows a primary node P coupled to secondary nodes S1-S3 via a communication network and data links 12-18. The communication network may include a LAN or a WAN. For purposes of explanation, the communication network is the Internet, it being understood that the term "communication network" should not be limited thereto.

Primary node P consists of a primary computer system 22 coupled to a data storage system 24 via data link 26. Data storage system 24 includes a memory 28 which includes several hard disks for storing data of a primary data volume V. Secondary node S1 includes a secondary computer system 32 coupled to data storage system 34 via data link 36. Data storage system 34 includes memory 38 consisting of several hard disks for storing a first replica R1 of primary volume V. Secondary node S2 includes secondary computer system 42 coupled to data storage system 44 via data link 46. Data storage system 44 includes memory 48 consisting of several hard disks for storing a second replica R2 of the primary volume V. Lastly, secondary node S3 includes a secondary computer system 52 coupled to data storage system 54 via data link 56. Data storage system 54 includes a memory 58 consisting of several hard disks that store data of a third replica R3 of primary volume V.

FIG. 2 illustrates in block diagram form primary volume V and replicas R1-R3. Each of volumes V and R1-R3 consists of $n_{max}$ data blocks. While it is said that each of these blocks contain data, it is to be understood that the data is physically stored within hard disk memory blocks allocated thereto. Thus, data of blocks $1$-$n_{max}$ of primary volume V are stored in distributed fashion within hard disks of memory 28. Further, data within blocks $1$-$n_{max}$ of replicas R1-R3 are stored in distributed fashion across hard disks in memories 38, 48, and 58, respectively, allocated thereto. Each of replicas R1-R3 is maintained as a real or near real-time copy of primary volume V. Thus, data of block n in primary volume V should be identical to data of blocks n in replicas R1-R3.

Primary computer system 22 is configured to receive requests from client computer systems (not shown) to read data from or write data to primary data volume V. In response to these requests, primary computer system 22 generates input/output (IO) transactions to read data from or write data to hard disks of memory 28. In the event of failure of primary node P, requests from client computer systems can be redirected to and serviced by one of the secondary nodes S1-S3. For example, suppose a client computer system generates a request to read data block 4 in the primary volume V after primary computer system 22 is rendered inoperable as a result of hardware failure. The read request can be redirected to secondary node S1 using mechanisms well known in the art. In response to receiving the read request, secondary computer system generates an IO transaction that accesses and reads data from a hard disk in memory 38 allocated to store block 4 data of replica R1. Data returned from memory 38 is subsequently forwarded by secondary computer system 32 to the client computer system that originally requested block 4 data. Since data of blocks n of the primary data volume V and replica R1 are or should be identical, valid data should be returned to the client computer system even though primary computer system 22 has failed.

Replicas R1-R3 can be maintained as a real-time or near real-time copy of primary volume V using one of several replication techniques including synchronous, asynchronous, and periodic replication. In each of these techniques, when a data block n of the primary data volume V is modified according to an IO transaction, the primary node P transmits a copy of the modified data block to each of the secondary nodes that store a replica. Each of the secondary nodes, in turn, overwrites its existing data block n with the copy received from the primary node P. In synchronous replication, the IO transaction that modified block n data of the primary data volume V is not considered complete until one or all of the secondary nodes acknowledge receipt of the copy of the modified data block n. In asynchronous replication, primary node P logs a copy of each data block of the primary data volume V that is modified by an IO transaction. Eventually, copies of the logged, modified data blocks are transmitted asynchronously to each of the secondary nodes S1-S3. The IO transaction that modifies data block n of the primary data volume V is considered complete when a copy of the modified block n is logged for subsequent transmission to secondary nodes S1-S3. Asynchronous replication requires ordering of dependent data modifications to ensure consistency between replicas R1-R3 and primary volume V. Synchronous replication does not require ordering. Periodic replication is yet another technique for maintaining replicas R1-R3. U.S. patent application Ser. No. 10/436,354 entitled, "Method and System of Providing Periodic Replication" (filed on May 12, 2003, incorporated herein by reference in its entirety) describes relevant aspects of periodic replication. Like synchronous and asynchronous replication, periodic replication requires that primary node P transmit a copy of a modified data block n of the primary data volume V to each of the secondary nodes S1-S3.

Modified data blocks of the primary data volume V can be transmitted from primary node P to each of the secondary nodes S1-S3 in separate transactions via the data link 12 and communication network. Each of the transactions transmitted to the secondary nodes S1-S3 may include a single modified data block or multiple modified data blocks of the primary data volume V. Either way, each of the secondary nodes S1-S3 receives, directly from primary node P, a copy of each data block n modified in primary data volume V.

The time needed for secondary nodes S1-S3 to update replicas R1-R3 with modified data blocks depends on the bandwidth of data link 12. The higher the bandwidth of data link 12, the faster transactions containing modified data blocks of the primary data volume V can be transmitted to secondary nodes S1-S3 for subsequent storage in replicas R1-R3, respectively. The cost of data link 12, however, is dependent on the bandwidth thereof. Table I below shows an example of how the cost of data link 12 can increase with bandwidth.

TABLE 1

Cost of Data Link Bandwidth

| Type of Link | Bandwidth (Mbps) | Approximate Cost (per month) |
| --- | --- | --- |
| T1 | 1.544 | $900-$1200 |
| E1 | 2.048 | $2000 |
| T3 | 44.736 | $10,000 + local loops + setup ($4000 each) |
| OC-3 | 155.5 | >$40,000 + local loops + setup (>$10,000 each) |
| OC-12 | 622.08 | >$400,000 + local loops + setup (>$100,000 each) |
| OC-48 | 2488 | >$2,000,000 + local loops + setup (>$200,000 each) |

SUMMARY OF THE INVENTION

In contrast to the prior art described within the background section, cooperative replication according to one or more of the embodiments described above reduces the total amount of modified data transmitted directly between the primary node and secondary nodes. The method in one embodiment can be performed by a computer system or several computer systems executing software instructions. The method may include modifying data in n data blocks of a data volume to create n modified data blocks. A copy of each of the n modified data blocks is created for subsequent transfer to other nodes. A first computer system transmits the n modified data block copies to n nodes, respectively, wherein each of the n nodes comprises a second computer system and a replica of the data volume prior to the modification of data in the n data blocks. Thereafter, one of the n second computer systems transmits a copy of the modified data block copy it receives to another of the n second computer systems

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention relates to a method or apparatus for maintaining several replica copies of a primary data volume. Using the present invention, secondary nodes that store replicas of the primary data volume cooperate with each other to maintain consistency between the replicas and the primary data volume.

Figure 1:
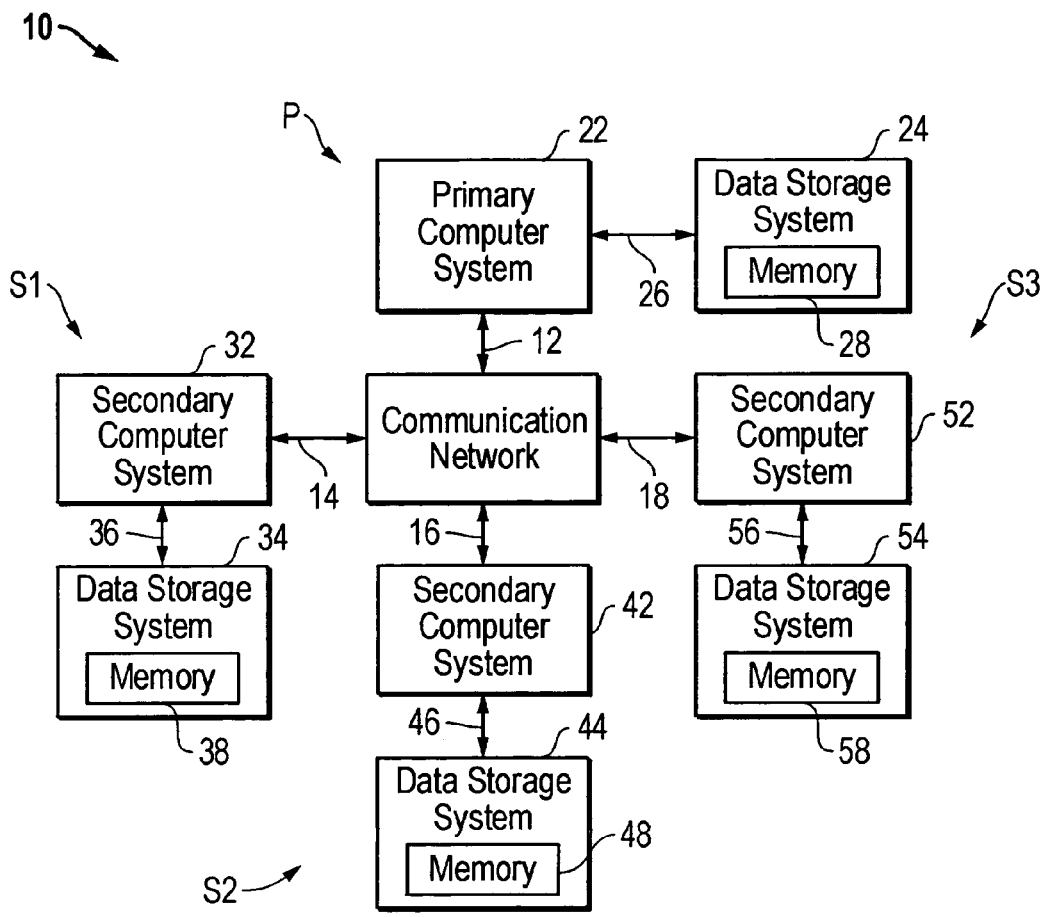
FIG. 1 is a block diagram of a data processing system employing storage subsystems.
Figure 2:
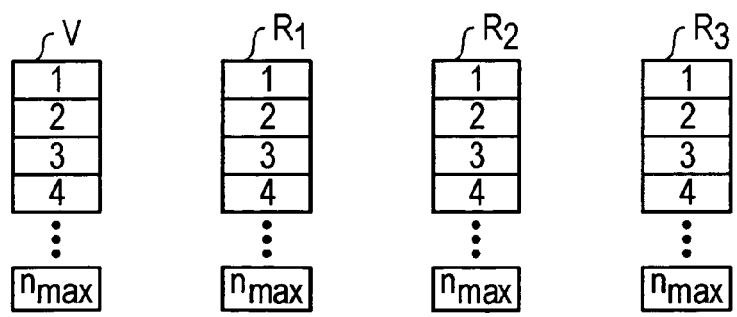
FIG. 2 shows block diagrams illustrating data contents of volumes in memory structure of storage systems shown in FIG. 2.
Figure 3:
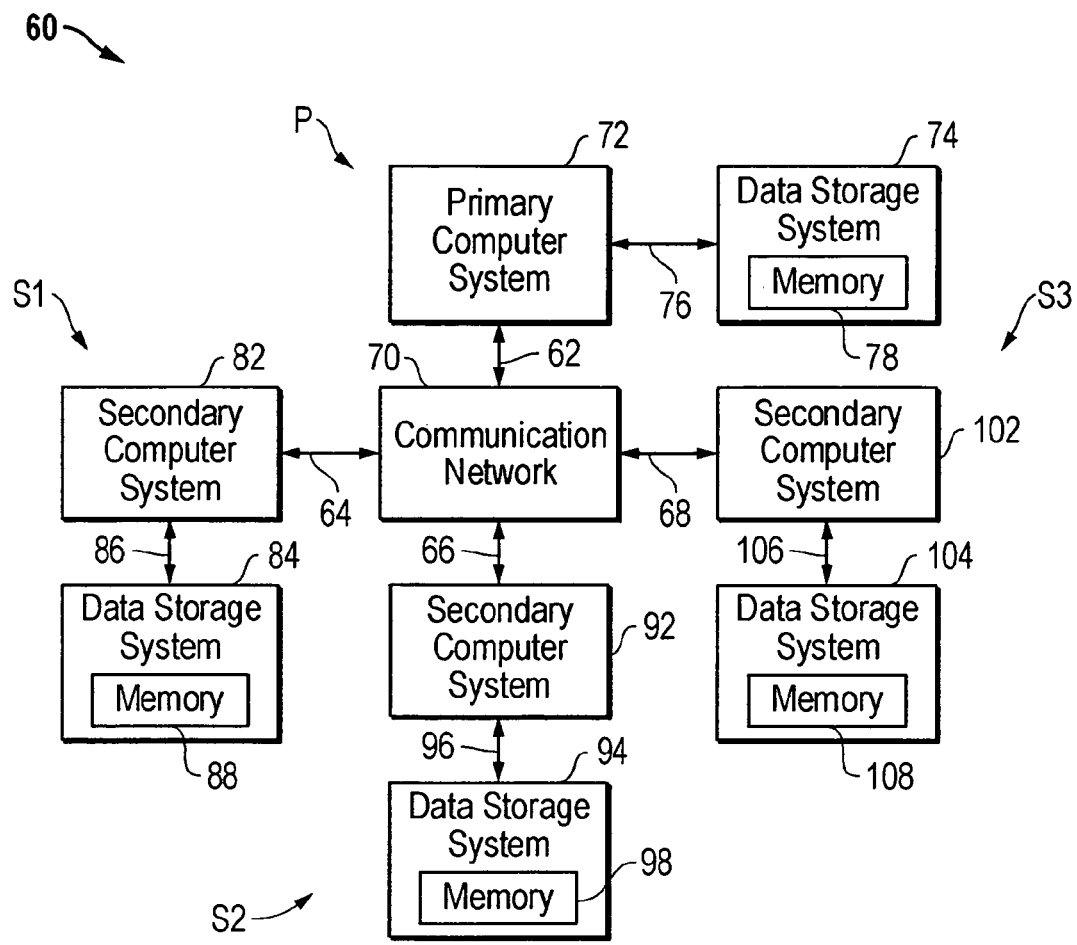
FIG. 3 is a block diagram of a data processing system employing one embodiment of the present invention.

FIG. 3 is a block diagram illustrating a data processing system 60 employing one embodiment of the present invention. Processing system 60 includes a primary node P coupled to secondary nodes S1-S3 via a communication network (e.g. the Internet) and data links 62-68. Primary node P stores a primary data volume V while secondary nodes S1-S3 store real or near real-time replicas R1-R3, respectively, of the primary volume V. The present invention should not be limited to a system which includes three replicas of a primary data volume; the present invention could be employed in a processing system that has fewer or more than three replicas of a primary data volume.

For purposes of explanation, each of the primary node P and the secondary nodes S1-S3 will be described below as containing a computer system (e.g., a server computer system) and a data storage system for storing the primary data volume V or one of the replicas R1-R3. The present invention should not be limited thereto. The primary node P and/or the secondary nodes S1-S3 may take form in fiber channel switches, storage appliances or storage arrays. In any embodiment, the primary node P is capable of sending copies of modified volume V data blocks to the secondary nodes S1-S3 in addition to instructions for the secondary nodes S1-S3 to distribute among each other copies of modified data blocks received from the primary node P.

It is further noted that the present invention need not be limited to an environment in which the primary data volume V is stored at a single node or in which each of the replicas R1-R3 are stored at a respective, single node. The present invention could be applied to hardware environment in which the data contents of the primary data volume V is distributed across several nodes each one of which contains a computer system (or similar device for processing data according to software instructions) and a data storage system. Further, the data contents of each of the replicas R1-R3 may be distributed across two or more nodes each containing a computer system (or similar device for processing data according to software instructions) and a data storage system.

Primary node P consists of a primary computer system 72 coupled to a data storage system 74 via data link 76. Data storage system 74 includes a memory 78 that includes one or more memory devices for storing data of a primary data volume V. Secondary node S1 includes a secondary computer system 82 coupled to data storage system 84 via data link 86. Data storage system 84 includes memory 88 that includes one or more memory devices for storing a first replica R1 of primary volume V. Secondary node S2 includes secondary computer system 92 coupled to data storage system 94 via data link 96. Data storage system 94 includes memory 98 that includes one or more memory devices for storing a second replica R2 of the primary volume V. Lastly, secondary node S3 includes a secondary computer system 102 coupled to data storage system 104 via data link 106. Data storage system 104 includes a memory 108 that includes one or more memory devices for storing data of a third replica R3 of primary volume V. For purposes of explanation, each of the memories 78, 88, 98 and 108 include several magnetic and/or optical hard disks for storing data, it being understood that the term "memory" should not be limited thereto.

Primary node P and secondary nodes S1-S3 each may execute a system for managing the distribution of data of a volume across one or more memory devices. Volume Manager™ provided by VERITAS Software Corporation of Mountain View, Calif., is an exemplary system for managing the distribution of data of a volume across one or more memory devices. Volume Manager™ virtualizes the memory devices (e.g., hard disks) of one or more data storage systems to form a large virtual disk that stores volume data. Volume and disk management products from other product software companies also provide a system for managing the distribution of volume data across multiple memory devices. Hardware RAID adapter cards and RAID firmware built into computer systems can also provide this function. In the embodiment where the data contents of the primary data volume V is distributed across several nodes each one of which contains a computer system (or similar device for processing data according to software instructions) and one or more data storage system, a distributed system such as Cluster Volume Manager™ provided by VERITAS Software Corporation of Mountain View, Calif. can be employed to manage the distribution of the volume data. Cluster Volume Manager™ can also be applied to manage the distribution of data in replicas R1-R3 when the data contents of each of the replicas R1-R3 is distributed across two or more nodes each containing a computer system (or similar device for processing data according to software instructions) and a data storage system. Virtualization of the hard disks may also be performed outside of the computer systems of primary node P and secondary nodes S1-S3. For example, virtualization of hard disks may occur in a SAN switch which connects a computer system to multiple data storage systems in primary node P. SAN Volume Manager™ provided by VERITAS Software Corporation is an exemplary system that can be employed in a SAN switch.

Figure 4:
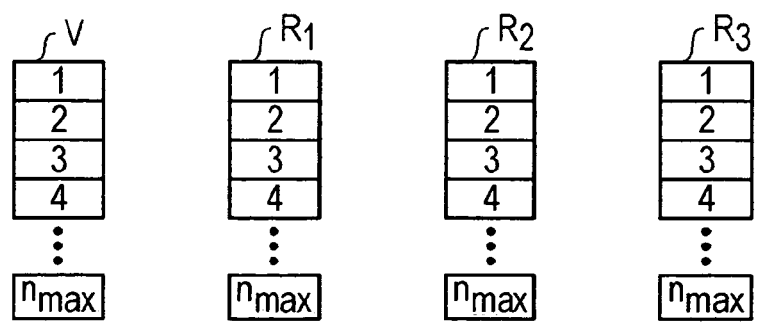
FIG. 4 shows block diagrams illustrating data contents of volumes in memory structure of storage systems shown in FIG. 3.

FIG. 4 illustrates in block diagram form primary volume V and replicas R1-R3. Each of volumes V and R1-R3 consists of $n_{max}$ data blocks. While it is said that each of the blocks contain data, it is to be understood that the data is physically stored within one or more hard disk memory blocks allocated thereto. Thus, data of blocks $1$-$n_{max}$ of primary volume V are stored in distributed fashion within hard disks of memory 78. Further, data within blocks $1$-$n_{max}$ of replicas R1-R3 are stored in distributed fashion across hard disks in memories 88, 98, and 108, respectively, allocated thereto. Each of replicas R1-R3 is maintained as a real or near real-time copy of primary volume V. Thus, data of block n in primary volume V should be identical to data of blocks n in replicas R1-R3.

Primary computer system 72 is configured to receive requests from client computer systems (not shown) to read data from or write data to primary data volume V. In response to these requests, primary computer system 72 generates IO transactions to read data from or write data to hard disks of memory 78. In the event of failure of primary node P, requests from client computer systems can be redirected to and serviced by any one of the secondary nodes S1-S3 using respective replicas R1-R3.

Each of replicas R1-R3 can be maintained as a real-time or near real-time copy of primary volume V using one of several replication techniques. To maintain consistency between primary data volume V and its replicas R1-R3, the replicas should be updated as soon as possible whenever a data block n of the primary data volume V is modified by, for example, an IO transaction generated by primary computer system 72. In contrast to the data processing system described in the background section above, primary node P does not directly send a copy of each modified block n of the primary volume V to each of the secondary nodes S1-S3. However, replicas R1-R3 are maintained as real or near real-time copies of primary data volume V using cooperative replication according to the present invention. For example, in one embodiment described below, primary node P sends a copy of three recently modified data blocks $w_1$-$w_3$ of the primary V to secondary nodes S1-S3, respectively. Each of the secondary nodes S1-S3 may forward a copy of the modified data block it receives from the primary node P to the other secondary nodes so that each of the secondary nodes S1-S3 eventually receives a copy of each of the modified data blocks $w_1$-$w_3$. Using this embodiment or other embodiments of the present invention, the bandwidth requirement of at least data link 62 can be reduced while retaining the speed at which replicas R1-R3 are maintained if a data link 62 of higher bandwidth is employed. A reduction in the bandwidth of data link 62 should reduce the costs of implementing and operating data processing system 60.

Figure 5:
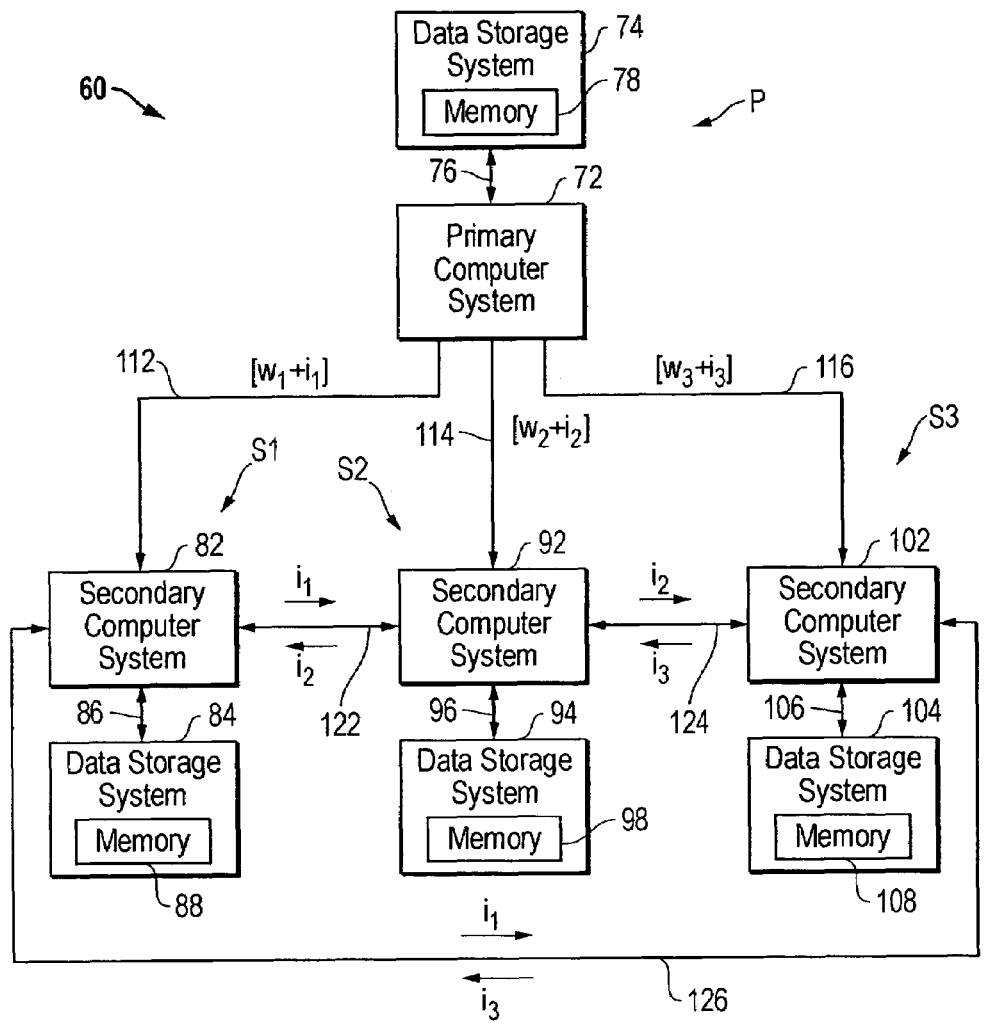
FIG. 5 shows the data processing system of FIG. 3 redrawn to more easily explain the present invention.

For ease in explaining operative aspects of the present invention, FIG. 5 shows the data processing system 60 of FIG. 3 redrawn so that primary node P is coupled to secondary nodes S1-S3 via communication links 112, 114, and 116, respectively; secondary node S2 coupled to secondary node S1 and S3 via communication links 122 and 124, respectively; and, secondary node S1 is coupled to secondary node S3 via communication link 126. Each of the communication links 112-116 and 122-126 consist of the communication network 70 and two of the data links 62-68 shown within FIG. 3. More particularly, communication link 112 consists of data link 62, communication network 70, and data link 64; communication link 114 consists of data link 62, communication network 70 and data link 66; communication link 116 consists of data link 62, communication network 70 and data link 68; communication link 122 consists of data link 64, communication network 70 and data link 66; communication link 124 consists of data link 66, communication network 70, and data link 68; and communication link 126 consists of data link 64, communication network 70, and data link 68.

Primary computer system 72 may contain a log (not shown) that temporarily stores copies of recently modified data blocks $w_x$ of primary data volume V. For purposes of explanation, each of the data blocks temporarily stored in the log contain data modified by a respective IO transaction, it being understood that two or more of the data blocks stored in the log may have been modified by a single IO transaction generated by primary computer system 72. In another embodiment some other tracking mechanism like bitmap or extent map can be used to identify the modified blocks.

When the log contains copies of at least three recently modified data blocks $w_1$-$w_3$ of the primary data volume V, primary computer system 72 transmits the modified blocks $w_1$-$w_3$ to secondary nodes S1-S3, respectively, via communication links 112-116, respectively. It is noted that the data blocks $w_1$-$w_3$ may be of different sizes. Primary computer system 72 may also transmit meta data items $i_1$-$i_3$, to secondary nodes S1-S3, respectively, via communication links 112-116, respectively. Meta data items $i_1$-$i_3$ may be contained in the same transactions to secondary nodes S1-S3 that contain modified data blocks $w_1$-$w_3$. Thus, primary computer system 72 may generate and send first, second, and third transactions to secondary nodes S1-S3, respectively, via communication links 112-116. The first, second, and third transactions contain modified data blocks $w_1$-$w_3$, respectively, and meta data items $i_1$-$i_3$, respectively, it being understood that the present should not be limited thereto.

Each of the meta data items $i_1$-$i_3$ may consist of an instruction or a copy of one or more of the modified data blocks $w_1$-$w_3$. The instruction may be a Send instruction that directs the secondary node receiving the Send instruction to send a copy of one or more modified data blocks identified by a list to one or more other secondary nodes, or the instruction may be a Recv instruction that directs the secondary node receiving the Recv instruction to receive a copy of a modified data block $w_x$ from another secondary node. Primary computer system 72 generates meta data item $i_x$ according to one of several different algorithms. Equations 1-3 below identify meta data $i_1$-$i_3$ generated by primary computer system 72 according to one algorithm.

$$i_1 = [\text{Send}(w_1, \{S2, S3\}) + \text{Recv}(w_2, \{S2\}) + \text{Recv}(w_3, \{S3\})] \quad (1)$$

$$i_2 = [\text{Send}(w_2, \{S1, S3\}) + \text{Recv}(w_1, \{S1\}) + \text{Recv}(w_3, \{S3\})] \quad (2)$$

$$i_3 = [\text{Send}(w_3, \{S1, S2\}) + \text{Recv}(w_1, \{S1\}) + \text{Recv}(w_2, \{S2\})] \quad (3)$$

Send($w_1$,{S2,S3}) of item $i_1$ instructs node S1 to send a copy of $w_1$ it received from primary computer system 72 to secondary nodes S2 and S3, while Recv($w_2$,{S2}) and Recv($w_3$,{S3}) instructs node S1 to receive from nodes S2 and S3 copies of $w_2$ and $w_3$, respectively, they received from primary computer system 72. Send($w_2$,{S1,S3}) of item $i_2$ instructs node S2 to send a copy of $w_2$ it received from primary computer system 72 to secondary nodes S1 and S3, while Recv($w_1$,{S1}) and Recv($w_3$,{S3}) instructs node S2 to receive from nodes S1 and S3 copies of $w_1$ and $w_3$, respectively, they received from primary computer system 72. Send($w_3$,{S1,S2}) of item $i_3$ instructs node S3 to send a copy of $w_3$ it received from primary computer system 72 to secondary nodes S1 and S2, while Recv($w_1$,{S1}) and Recv($w_2$,{S2}) instructs node S3 to receive from nodes S1 and S2 copies of $w_1$ and $w_2$, respectively, they received from primary computer system 72. Once instructions of items $i_1$-$i_3$ are successfully performed by computer systems 82, 92, and 102, respectively, computer systems 82, 92, and 102 can overwrite existing data blocks of replicas R1-R3, respectively with $w_1$-$w_3$ to put replicas into a consistent state with primary data volume V. Copies of data blocks $w_1$-$w_3$ in the log of primary computer system can be deleted or marked as sent. In another embodiment where log is not used, the bitmap or extent map can be modified to indicate that the data has been applied by the secondaries.

Meta data items may be generated by primary computer system 72 according to the following algorithms:

$$i_1 = [w_2 + \text{Send}(w_1, \{S2\}) + \text{Recv}(w_3, \{S3\})] \quad (4)$$

$$i_2 = [w_3 + \text{Send}(w_2, \{S3\}) + \text{Recv}(w_1, \{S1\})] \quad (5)$$

$$i_3 = [w_1 + \text{Send}(w_3, \{S1\}) + \text{Recv}(w_2, \{S2\})] \quad (6)$$

Each of meta data items $i_1$-$i_3$ defined by equations 4-6 above includes a copy of data block in addition to a pair of instructions. Thus, in addition to sending copies of blocks $w_1$-$w_3$ to secondary nodes S1-S3, respectively, primary computer system 72 sends a copy of blocks $w_2$, $w_3$, and $w_1$, to secondary nodes S1-S3, respectively, via items $i_1$-$i_3$, respectively. In other words, each of the secondary nodes S1-S3 receives copies of two of the modified data block $w_1$-$w_3$ directly from primary computer system 72 in this embodiment. Send($w_1$,{S2}) of item $i_1$ instructs node S1 to send a copy of $w_1$ it received from primary computer system 72 to secondary node S2, while Recv($w_3$,{S3}) instructs node S1 to receive from node S3 a copy of $w_3$ it received from primary computer system 72. Send($w_2$,{S3}) of item $i_2$ instructs node S2 to send a copy of $w_2$ it received from primary computer system 72 to secondary node S3, while Recv($w_1$,{S1}) instructs node S2 to receive from node S1 a copy of $w_1$ it received from primary computer system 72. Send($w_3$,{S1}) of item $i_3$ instructs node S3 to send a copy of $w_3$ it received from primary computer system 72 to secondary node S1, while Recv($w_2$,{S2}) instructs node S3 to receive from node S2 a copy of $w_2$ it received from primary computer system 72. Once instructions of items $i_1$-$i_3$ are successfully performed by computer systems 82, 92, and 102, respectively, computer systems 82, 92, and 102 can overwrite existing data blocks of replicas R1-R3, respectively with $w_1$-$w_3$ to place replicas into a consistent state with primary data volume V. Copies of data blocks $w_1$-$w_3$ in the log of primary computer system can be deleted. The embodiment involving equations (4)-(6) is useful when links 122-126 between secondary nodes S1-S3 have limited bandwidth or other insufficiencies when compared to links 112-116.

In yet another embodiment, primary computer system 72 generates meta data items $i_1$-$i_3$ according to the equations below:

$$i_1 = [\text{Send}(w_1, \{S2, S3\}) + \text{Recv}(w_2, \{S2\}) + \text{Recv}(w_3, \{S2\})] \quad (7)$$

$$i_2 = [w_3 + \text{Send}(w_2, \{S1, S3\}) + \text{Send}(w_3, \{S1, S3\}) + \text{Recv}(w_1, \{S1\})] \quad (8)$$

$$i_3 = [-w_3 + \text{Recv}(w_1, \{S1\}) + \text{Recv}(w_2, \{S2\}) + \text{Recv}(w_3, \{S2\})] \quad (9)$$

In this embodiment, not all secondary nodes S1-S3 will receive a copy of $w_1$-$w_3$, respectively, directly from the primary computer system. The $-w_3$ in $i_3$ indicates that secondary node S3 does not receive a copy of $w_3$ directly from primary computer system 72. The Send and Recv instructions of equations (7)-(9) operate similar to that described above. In this embodiment, node S3 will receive copies of $w_1$-$w_3$ from secondary nodes S1 and S2 when the instructions in items $i_1$ and $i_2$ are completed. Once instructions of items $i_1$-$i_3$ are successfully performed by computer systems 82, 92, and 102, respectively, computer systems 82, 92, and 102 can overwrite existing data blocks of replicas R1-R3, respectively with $w_1$-$w_3$ to place replicas into a consistent state with primary data volume V. Copies of data blocks $w_1$-$w_3$ in the log of primary computer system can be deleted. This embodiment can be useful when the communication links 122-126 between the secondary nodes S1-S3 are in a better condition (e.g., have a higher bandwidth) than the communication link between primary node P and one or more secondary nodes S1-S3.

The meta data items $i_1$-$i_3$ could be generated based upon many different types of statistics. For example, primary computer system 72 can take into account differences in data transmission rates between links 122-126. The equations below illustrate how primary computer system 72 can generate items $i_1$-$i_3$ in a situation where the communications links 122 and 126 have higher bandwidth when compared to the communication link 124.

$$i_1 = [w_2 + w_3 + \text{Send}(w_1, \{S2, S3\}) + \text{Send}(w_2, \{S3\}) + \text{Send}(w_3, \{S2\})] \quad (10)$$

$$i_2 = [\text{Recv}(w_1, \{S1\}) + \text{Recv}(w_3, \{S1\})] \quad (11)$$

$$i_3 = [\text{Recv}(w_1, \{S1\}) + \text{Recv}(w_2, \{S1\})] \quad (12)$$

Normally, modification of the data block according to a write data 10 transaction to the primary data volume V is considered complete in asynchronous replication when a copy of the modified data block is stored in the log of primary computer system 72. Further, modification of the data block according to a write data 10 transaction to the primary data volume V is considered complete in synchronous replication when the secondary node acknowledges that its replica has been updated. In the present invention, modified data is multiplexed to the secondary nodes, and the secondary nodes in turn cooperate with each other to update their respective replicas accordingly. The system 60 shown with FIG. 5 can use at least two alternatives in declaring when a write data 10 transaction has completed at the primary node P. In the first alternative called soft mode, a data modification to the primary data volume V is considered complete as soon as the secondary nodes S1-S3 receive $[w_1+i_1]$, $[w_2+i_2]$, and $[w_3+i_3]$, respectively, from primary computer system 72. This means the primary nodes do not wait for the secondary nodes to update their respective replicas. In the alternative designated hard mode, the primary node waits for all secondaries S1-S3 to update their replicas R1-R3, respectively, and become consistent with the primary data volume V. Here the write data IO transaction at the primary node P will be declared complete when all the secondaries S1-S3 receive all modified data blocks $w_1$-$w_3$ from the primary node P and/or each other, and have acknowledged back to the primary node P that the replicas R1-R3 have been updated.

For synchronous replication the soft mode may only be suitable if the user is willing to keep the secondaries incomplete for a short duration. For periodic replication, the soft mode may be a bit complex to implement since refresh and restore operations on the primary data volume V and the replicas R1-R3 have to be synchronous. Hard mode may be more useful to asynchronous and periodic replication modes.

In contrast to the prior art described within the background section, cooperative replication according to one or more of the embodiments described above reduces the total amount of modified data transmitted directly between the primary node P and secondary nodes S1-S3. To illustrate, if each of the modified data blocks $w_1$-$w_3$ consist of 64K bits of data, the primary node P will send (3*3*64)K for a total 576K worth of data to the secondary nodes S1-S3. But with cooperative replication using one of the embodiments described above, primary node P may send only (3*64)K or 192K worth of data (plus some meta data items consisting of instructions having insignificant bit lengths) to the secondaries S1-S3. As such, cooperative replication may reduce the bandwidth requirements between the primary node P and the secondary nodes S1-S3. Further, using an embodiment of the present invention, the buffer/memory requirements for transmitting data between the primary and the secondary nodes is reduced. Cooperative replication of the present invention also utilizes links 122-126 more when compared to the prior art. Lastly, cooperative replication, according to one or more of the embodiments described above, may reduce the processing bandwidth of primary computer system 72 since primary computer system 72 need not send multiple copies of modified data blocks to each of the secondary nodes S1-S3.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
    modifying data in n data blocks of a data volume to create n modified data blocks;
    a primary node transmitting the n modified data blocks to n nodes, respectively, wherein each of the n nodes comprises a replica of the data volume prior to the modification of data in the n data blocks;
    a first node of the n nodes transmitting a copy of the modified data block copy it receives from the primary node to a second node of the n nodes;
    the second node overwriting data in its respective replica with the modified data block copy the second node receives from the primary node;
    the second node overwriting data in its respective replica with the copy of the modified data block copy transmitted by the first node;
    the second node transmitting a copy of the modified block copy it receives from the primary node to the first node.

2. The method of claim 1 further comprising:
    the first node overwriting data in its respective replica with the modified data block copy the first node receives from the primary node;
    the first node overwriting data in its respective replica with the copy of the modified data block copy transmitted by the second node.

3. The method of claim 2 wherein the replicas of the first and second nodes contain identical data after:
    the second node overwrites data in its respective replica with the modified data block copy the second node receives from the primary node;
    the second node overwrites data in its respective replica with the copy of the modified data block copy transmitted by the first node;
    the first node overwrites data in its respective replica with the modified data block copy the first node receives from the primary node;
    the first node overwrites data in its respective replica with the copy of the modified data block copy transmitted by the second node.

4. The method of claim 1 wherein the first node receives the copy of the modified data block copy from the primary node via a first communication link, wherein the first node transmits the copy of the modified data block copy it receives to the second node via a second communication link, wherein the first and second communication links are different from each other.

5. A method comprising:
    modifying data in n data blocks of a data volume to create n modified data blocks;
    a primary node transmitting the n modified data blocks to n nodes, respectively, wherein each of the n nodes comprises a replica of the data volume prior to the modification of data in the n data blocks;
    the primary node transmitting information to a first node of the n nodes, wherein the information comprises an instruction for the first node to send to a second node of the n nodes a copy of the modified data block the first node receives from the primary node.

6. The method of claim 5 wherein the information further comprises a second instruction for the first node to receive from the second node a copy of the modified data block copy received by the second node from the primary node.

7. The method of claim 5 wherein the primary node transmits one of the n modified data blocks and the information to the first node in a single transaction via a communication link between the primary node and the first node.

8. The method of claim 5 wherein the n nodes overwrite existing data in their respective replica with the n modified data blocks, respectively, received directly from the primary node.

9. The method of claim 5 each of the n nodes overwrites existing data in its respective replica with one of the n modified data blocks received directly from another of the n nodes.

10. A computer readable medium storing instructions executable by one or more processors of a primary node, wherein the primary node implements a method in response to executing the instructions, the method comprising:

transmitting n modified data blocks of a data volume to n nodes, respectively, wherein each of the n nodes comprises a replica of the data volume prior to the modification of data in each of the n data blocks;

transmitting information to a first node of the n nodes, wherein the information comprises an instruction for the first node to send to a second node of the n nodes a copy of the modified data block the first node receives from the primary node.

11. The computer readable medium of claim 10 wherein the information further comprises a second instruction for the first node to receive from the second node a copy of the modified data block received by the second node from the primary node.

12. A computer readable medium storing instructions executable by one or more processors of a first node, wherein the first node comprises a first replica of a data volume stored at a primary node, wherein the first node implements a method in response to executing the instructions, the method comprising:

overwriting a data block of the first replica with a copy of a first data block received from the primary node;

transmitting the first data block copy to a second node that stores a second replica copy of the data volume;

overwriting data of a second data block of the first replica with a copy of a second data block received from the second node.

13. The computer readable medium of claim 12 wherein the first node overwrites the data block in response to receiving the first data block copy from the primary node via a first communication link, wherein the first node transmits the copy of the first data block to the second node via a second communication link, where the first communication link is different from the second communication link.

14. An apparatus comprising:

a primary node coupled to n nodes, wherein the primary node comprises a data volume;

means for modifying data in n data blocks of the data volume to create n modified data blocks;

means for transmitting the n modified data blocks to the n nodes, respectively, wherein each of the n nodes comprises a replica of the data volume prior to the modification of data in the n data blocks;

means for transmitting a copy of the modified data block copy received by a first node of the n nodes from the primary node to a second node of the n nodes;

means for transmitting a copy of the modified block copy the second node receives from the primary node to the first node.

15. An apparatus comprising:

a primary node comprising a data volume and a memory medium that stores instructions executable by one or more processors of the primary node, wherein the primary node implements a method in response to executing the instructions, the method comprising:

modifying data in n data blocks of the data volume to create n modified data blocks;

a primary node transmitting the n modified data blocks to n nodes, respectively, wherein each of the n nodes comprises a replica of the data volume prior to the modification of data in the n data blocks;

the primary node transmitting information to a first node of the n nodes, wherein the information comprises an instruction for a first node to send to a second node of the n nodes a copy of the modified data block the first node receives from the primary node.

* * * * *